April 9, 1929.  J. R. GAMMETER  1,708,129
METHOD AND APPARATUS FOR MAKING ENDLESS BANDS
Filed Sept. 14, 1927  11 Sheets-Sheet 3
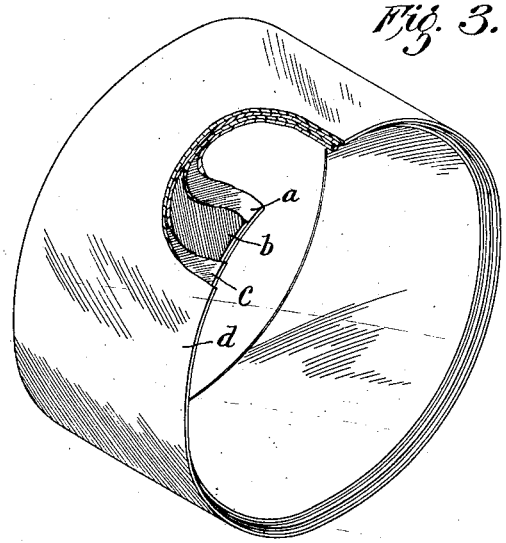
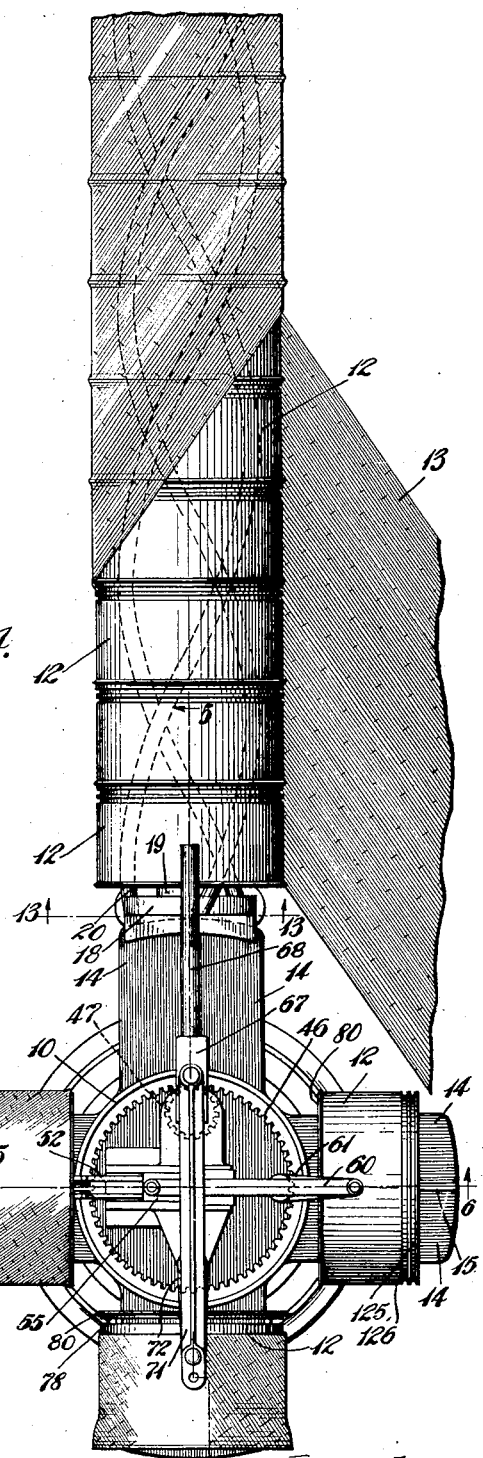
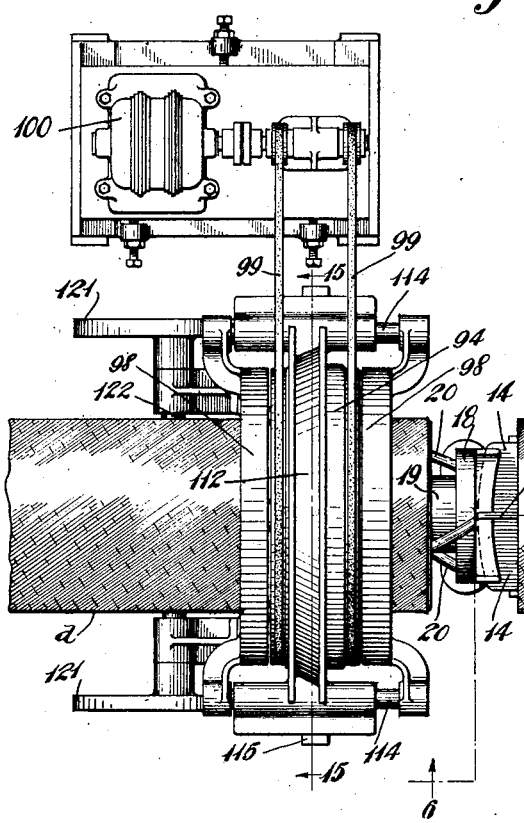
Inventor
John R. Gammeter

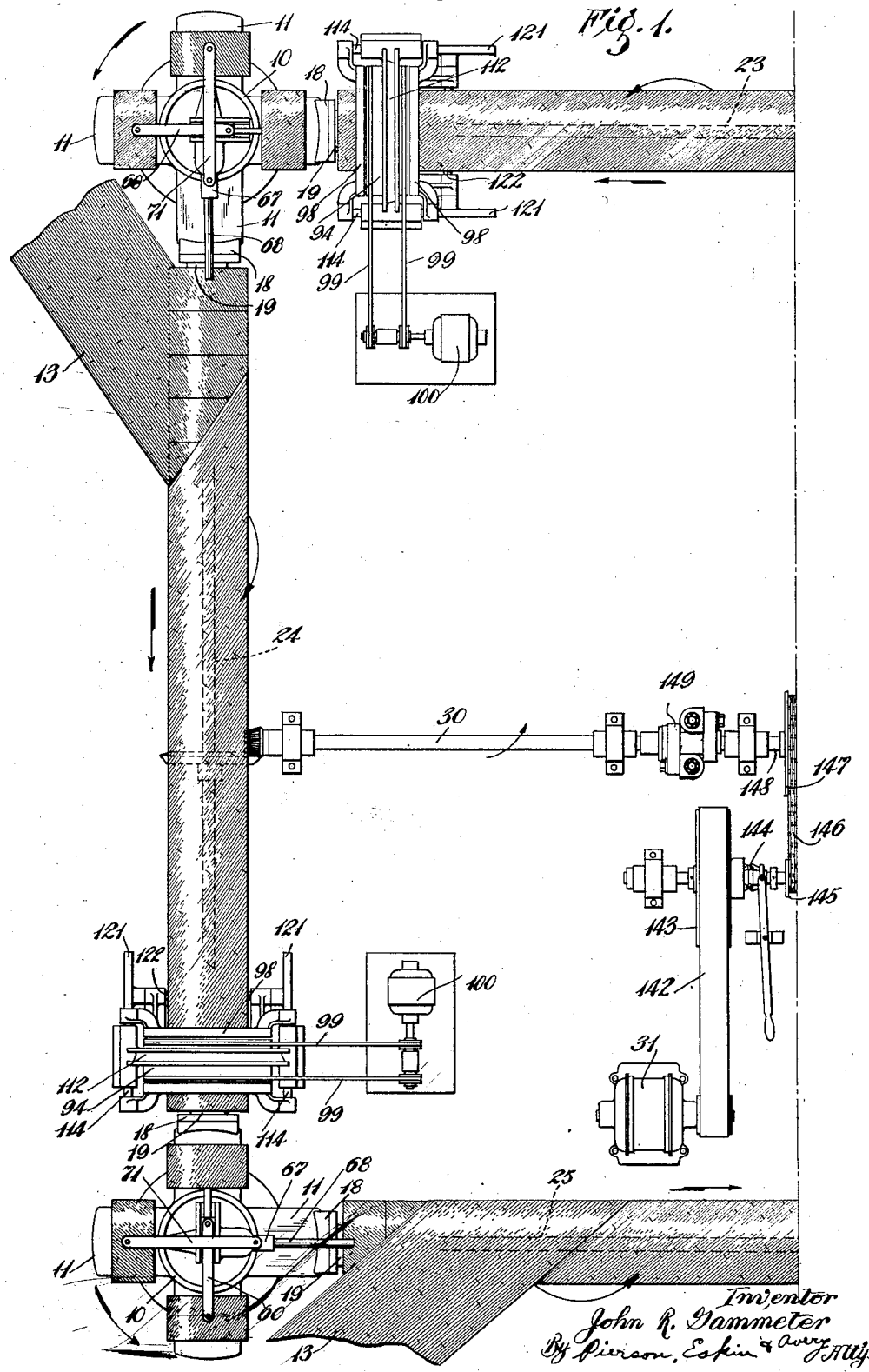

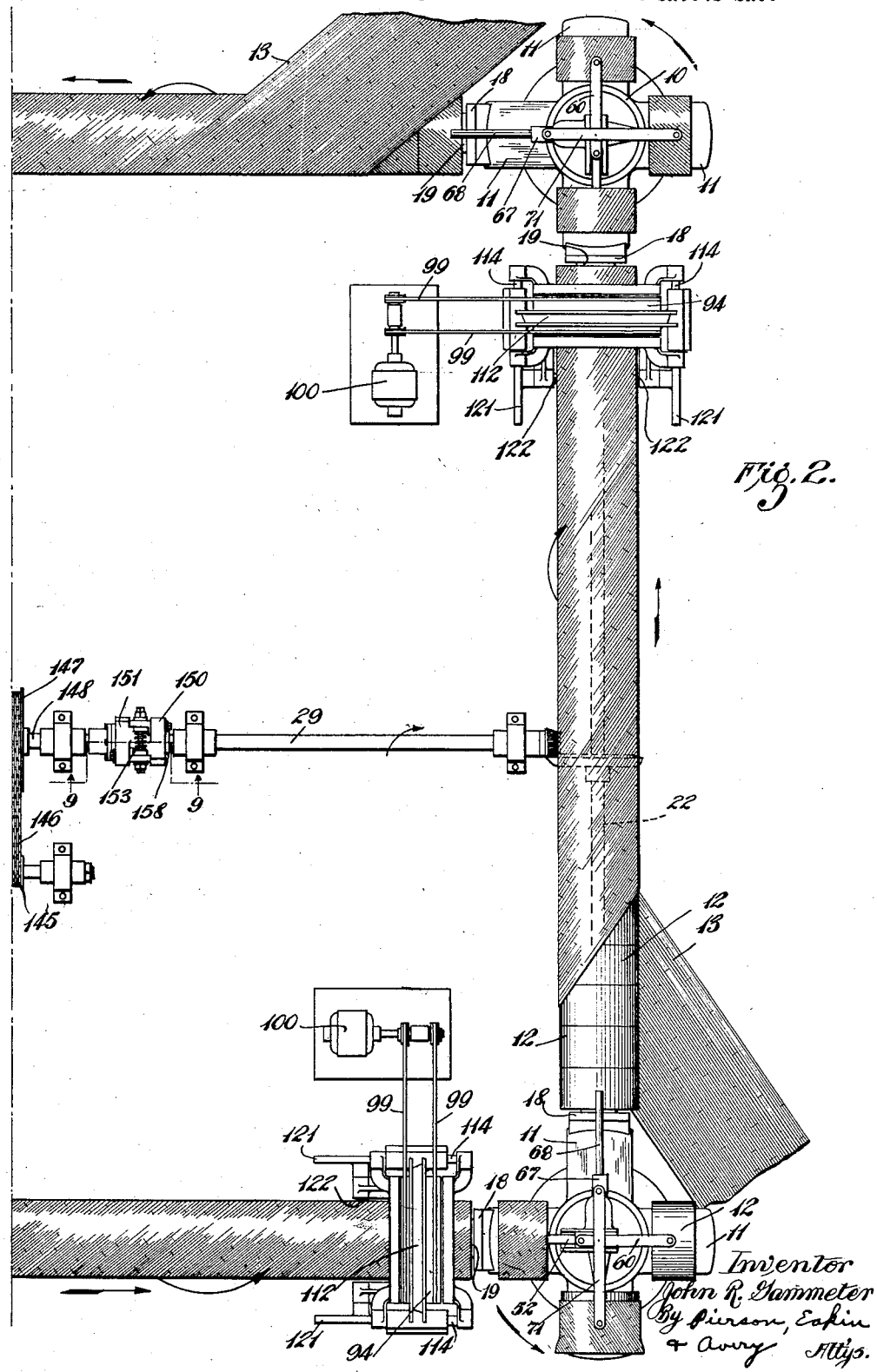

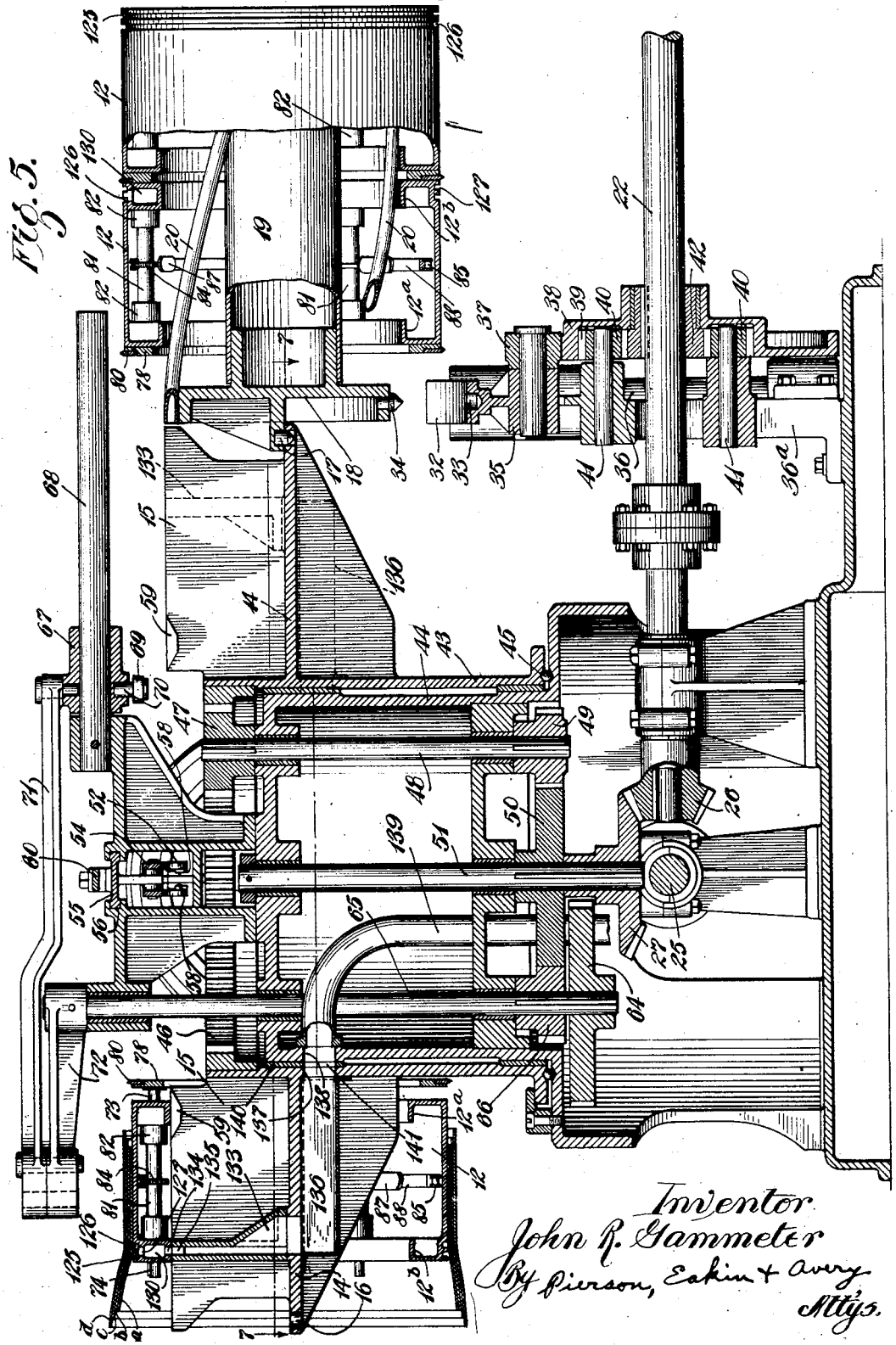

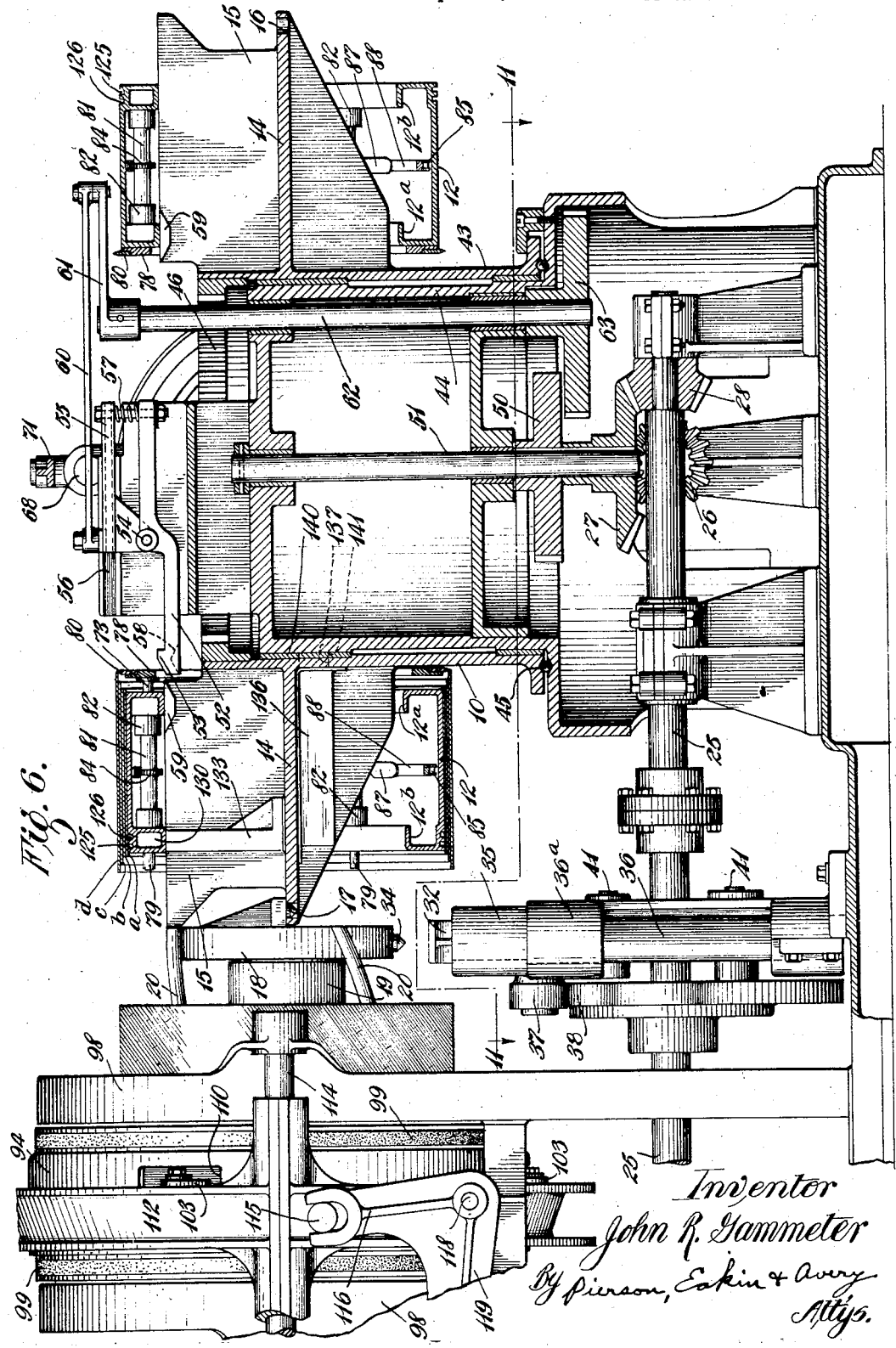

April 9, 1929. J. R. GAMMETER 1,708,129
METHOD AND APPARATUS FOR MAKING ENDLESS BANDS
Filed Sept. 14, 1927 11 Sheets-Sheet 6
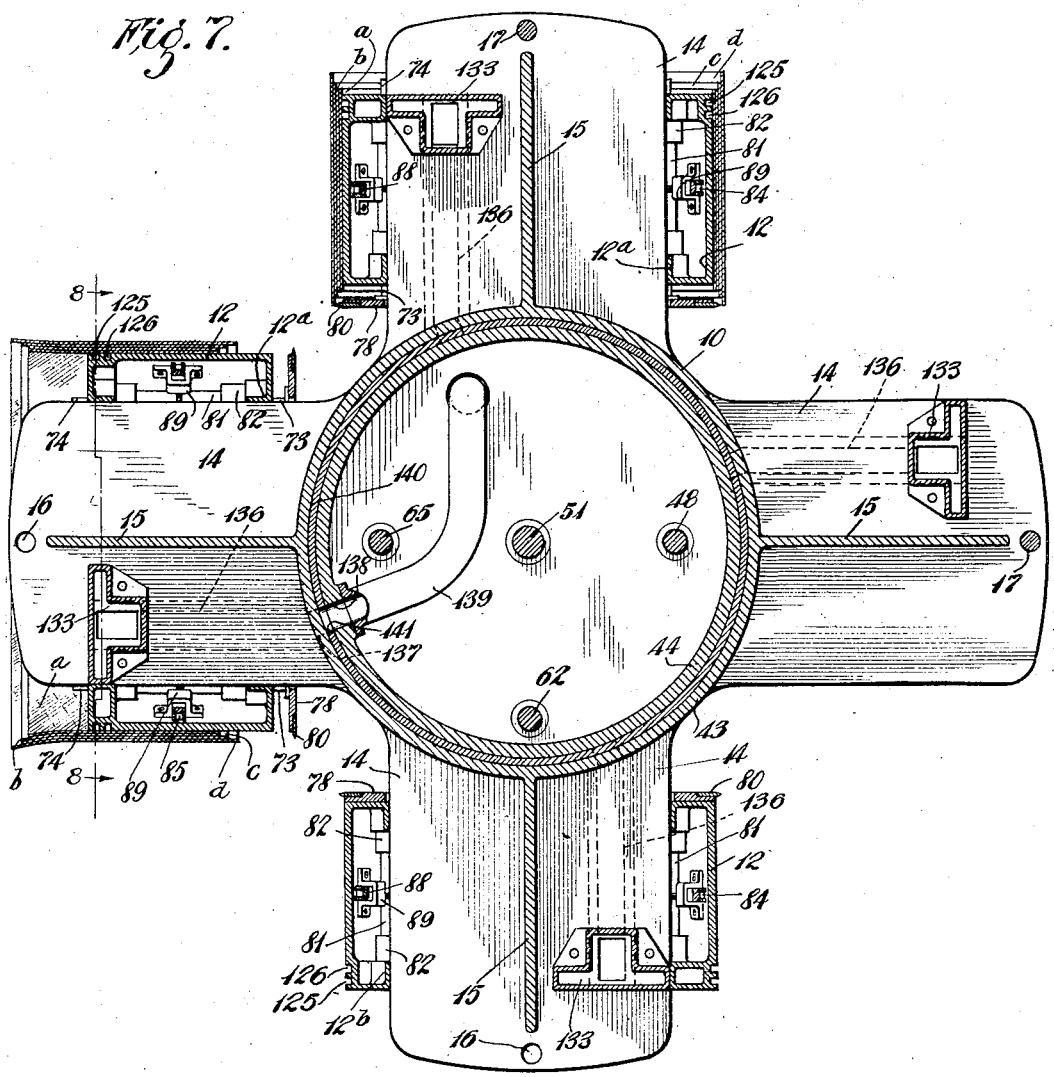
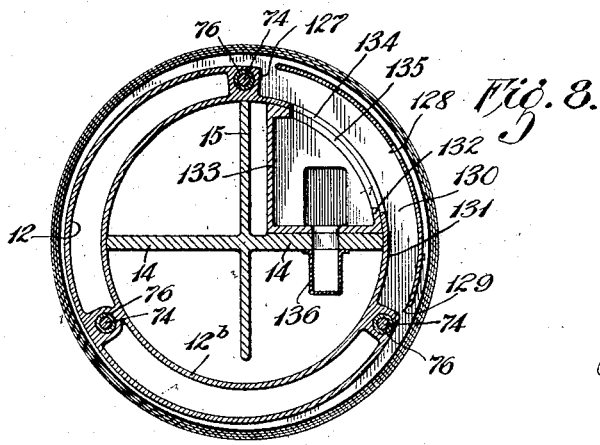
Inventor
John R. Gammeter
By Pierson, Eakin & Avery
Attys

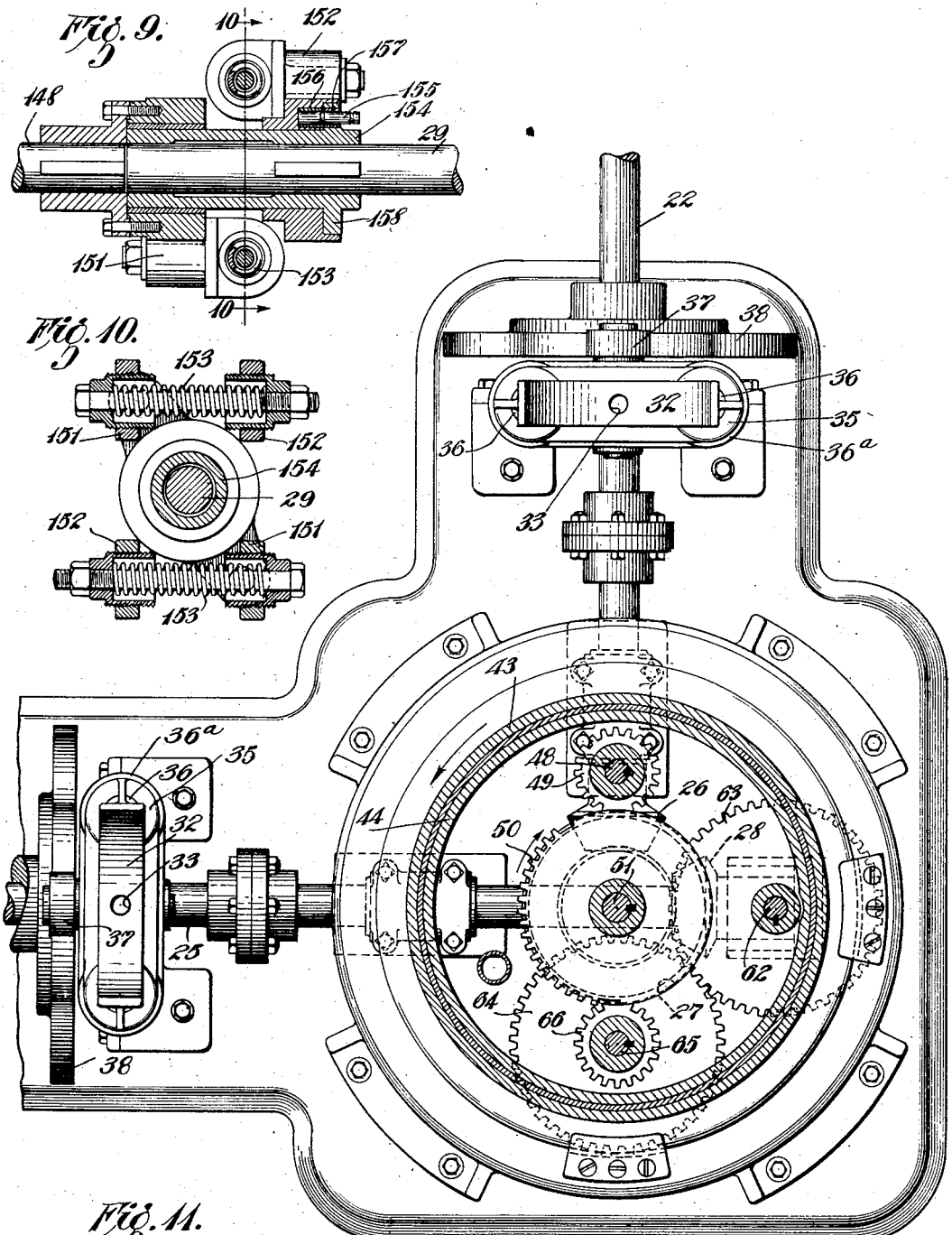

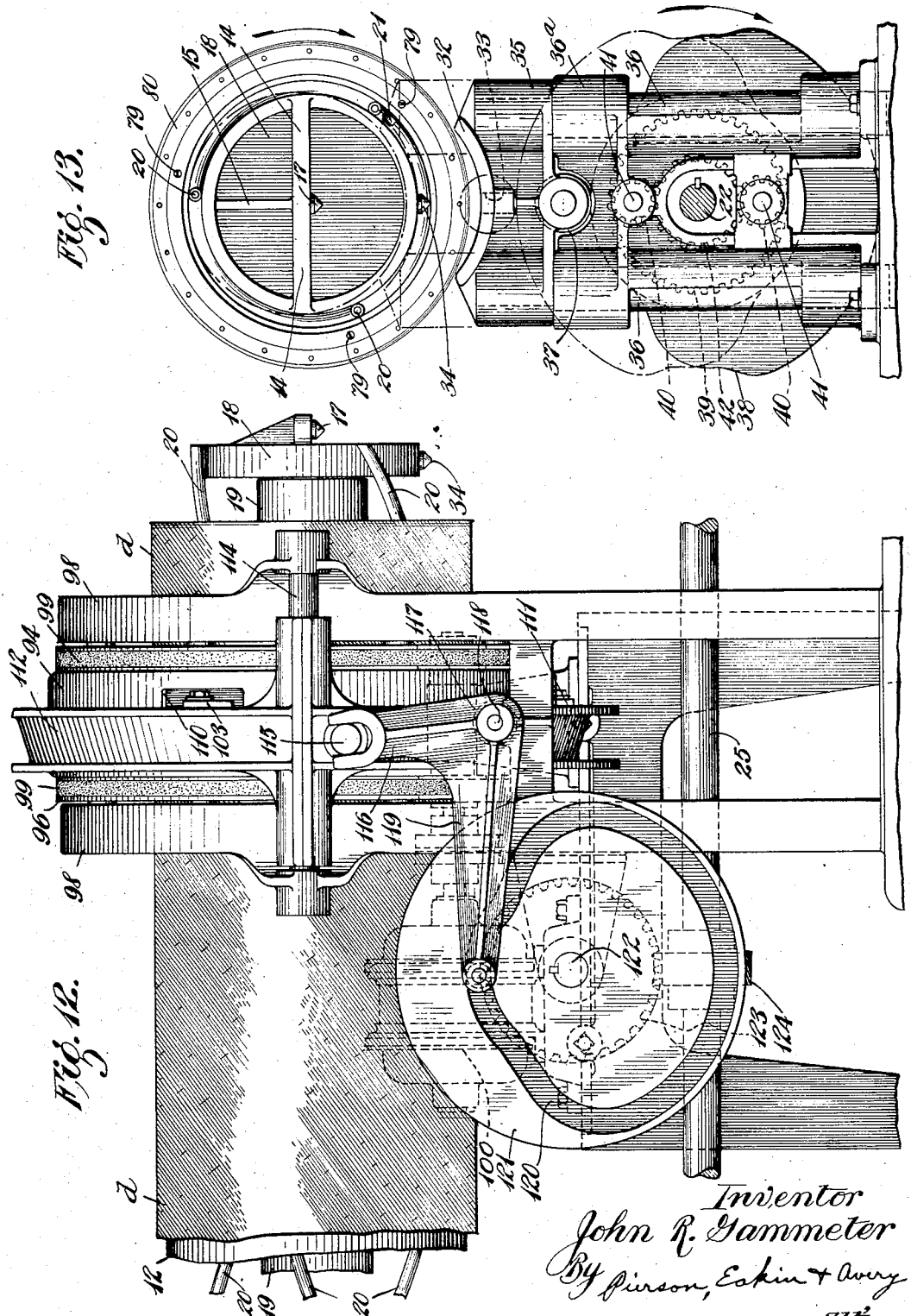

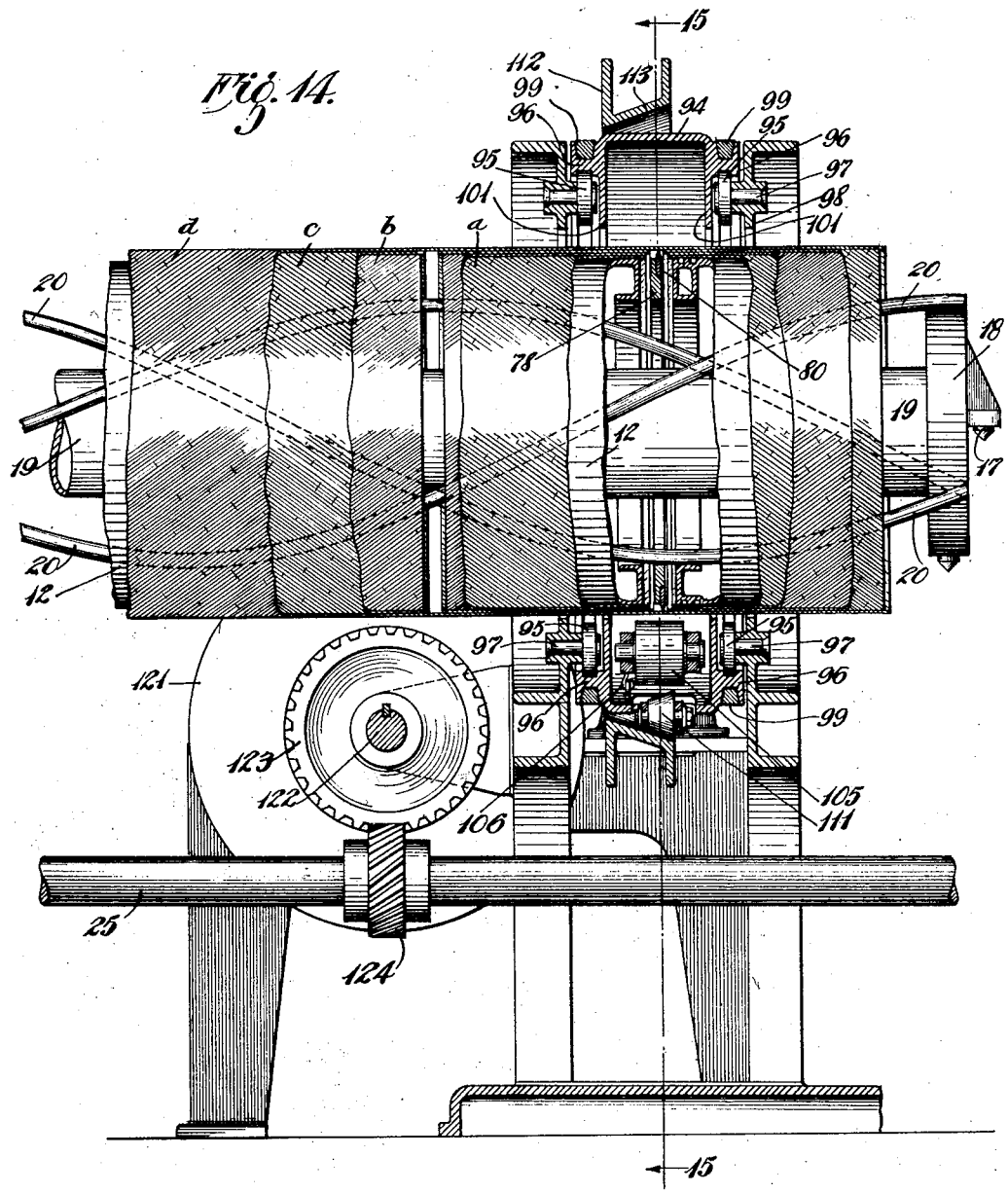

April 9, 1929.   J. R. GAMMETER   1,708,129
METHOD AND APPARATUS FOR MAKING ENDLESS BANDS
Filed Sept. 14, 1927   11 Sheets-Sheet 10

Inventor
John R. Gammeter
By Pierson, Eskin & Avery
Attys.

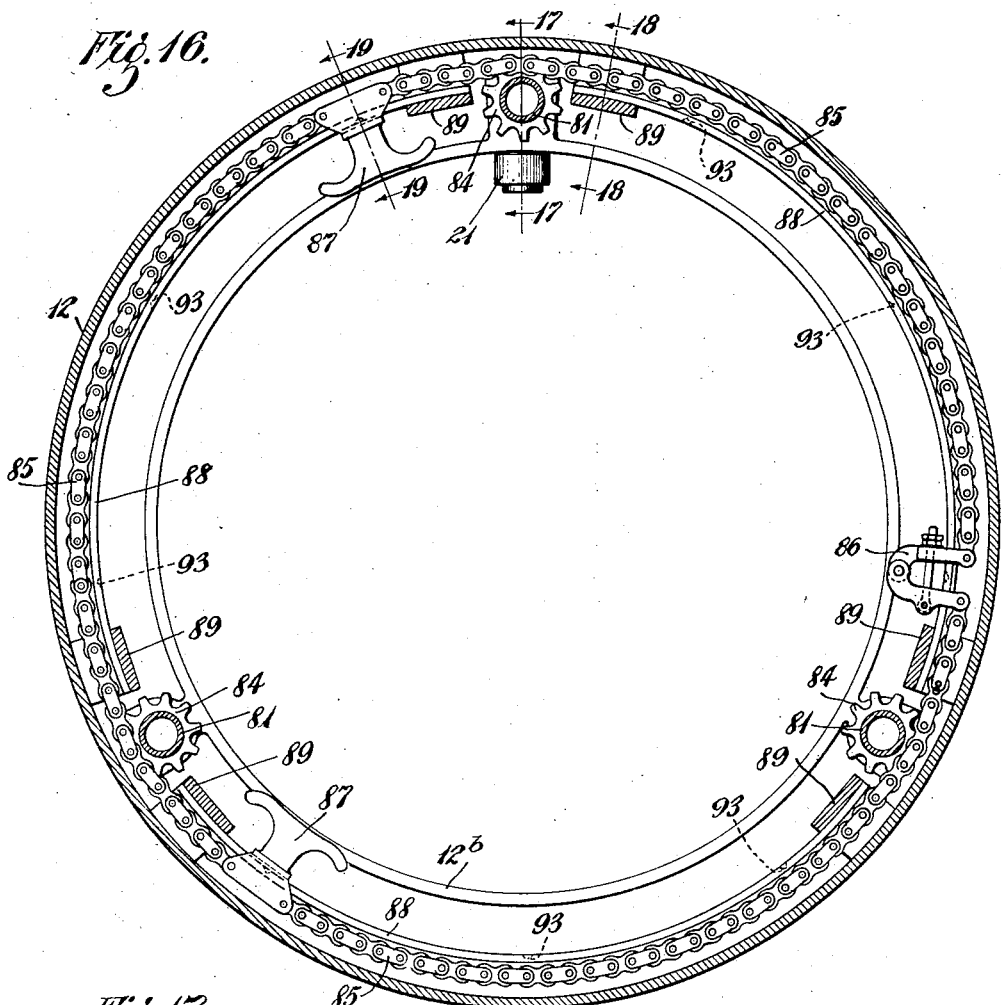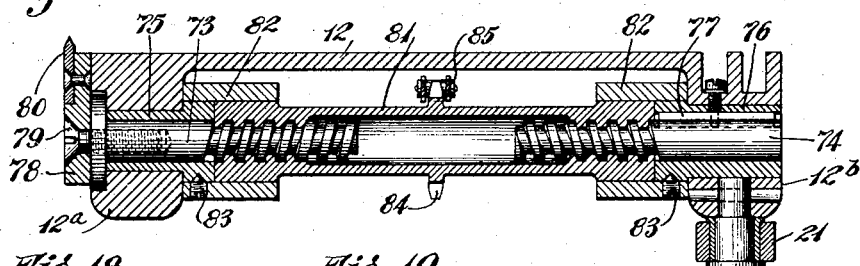

Patented Apr. 9, 1929.

1,708,129

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

METHOD AND APPARATUS FOR MAKING ENDLESS BANDS.

Application filed September 14, 1927. Serial No. 219,458.

This invention relates to the production of endless bands such as the bands of weak-wefted or weftless rubberized fabric employed in the manufacture of pneumatic tires.

My chief objects are to provide economy and to provide accuracy in the forming of such bands; to avoid waste of materials; to provide highly automatic apparatus for making such bands; to provide for a large production in proportion to the floor space required; to provide for ready adaptation of the apparatus to produce bands of different sizes; and to provide improved procedure and apparatus whereby a laminated band having its plies of different widths may be conveniently and economically produced.

More detailed objects and advantages will be manifest.

General description.

The preferred embodiment of the invention which is shown in the accompanying drawings is adapted to produce tire bands each consisting of four plies of fabric and consequently comprises four sets of winding and severing devices, which preferably are arranged in the form of a rectangle. Turrets are mounted at the respective corners of the rectangle for supporting four mandrel structures, each of which is adapted to guide and cause rotation of a succession of winding-forms or drums, the drums being forced along the mandrel structure in mutually abutted relation by the passing of additional drums onto the mandrel structure. The drums are adapted to draw onto them a web of fabric, in the form of a helical winding, in their forward and rotative movement, the winding providing a tubular fabric structure adapted to be severed transversely into bias-cut, endless tire bands.

Each turret is provided with horizontal arms adapted to support the adjacent ends of the two adjacent mandrel structures, one arm of the turret being associated with the delivery end of one mandrel structure to receive a winding-form or drum therefrom while the following arm of the turret is associated with the receiving end of the other mandrel structure for the passage of a drum onto the latter from the turret arm.

Means are provided for concurrently lifting all of the mandrel structures momentarily by engagement with the extremities thereof beyond the series of drums mounted thereon, to clear the mandrel structures from the turrets to permit indexing of the latter, so that the arms of the turret may be brought in succession into association with the mandrel structures, for the transfer of the drums in succession from the one mandrel structure to the other. Each mandrel structure is adapted to cause rotation of the drums in the opposite direction to that in which the drum is rotated by the preceding mandrel structure, so that successive plies of fabric drawn onto the drums by their rotation on the successive mandrel structures will have the strength giving cords of each ply crossed with relation to those of the adjacent ply or plies.

Near the delivery end of each mandrel structure is mounted an annular severing device encircling the mandrel structure and the drums thereon and adapted to sever the tube of fabric, between successive drums, into endless bands.

The means for lifting and lowering the mandrel structures, for indexing the turrets and for actuating the severing devices, are all so operatively connected as to be actuated in timed relation, so that the operation is continuous and automatic.

Of the accompanying drawings:

Figs. 1 and 2 together constitute a plan view of apparatus embodying and adapted to carry out my invention in its preferred form.

Fig. 3 is a perspective view with parts broken away of a four-ply tire band as produced in the practice of my invention.

Fig. 4 is a plan view of parts of the apparatus in the region where the band-building operation begins and ends.

Fig. 5 is a vertical section on line 5—5 of Fig. 4.

Fig. 6 is a vertical section on line 6—6 of Fig. 4.

Fig. 7 is a horizontal section on line 7—7 of Fig. 5.

Fig. 8 is a vertical section on line 8—8 of Fig. 7.

Fig. 9 is a vertical section on line 9—9 of Fig. 2.

Fig. 10 is a vertical section on line 10—10 of Fig. 9.

Fig. 11 is a horizontal section on line 11—11 of Fig. 6.

Fig. 12 is an elevation of parts of the apparatus including means for cutting a wound tubular structure of fabric into endless bands.

Fig. 13 is a vertical section on line 13—13 of Fig. 4.

Fig. 14 is a vertical section on line 14—14 of Fig. 15, with parts shown in elevation and broken away.

Fig. 16 is a vertical section of one of the winding forms or drums employed in the apparatus.

Figure 15:
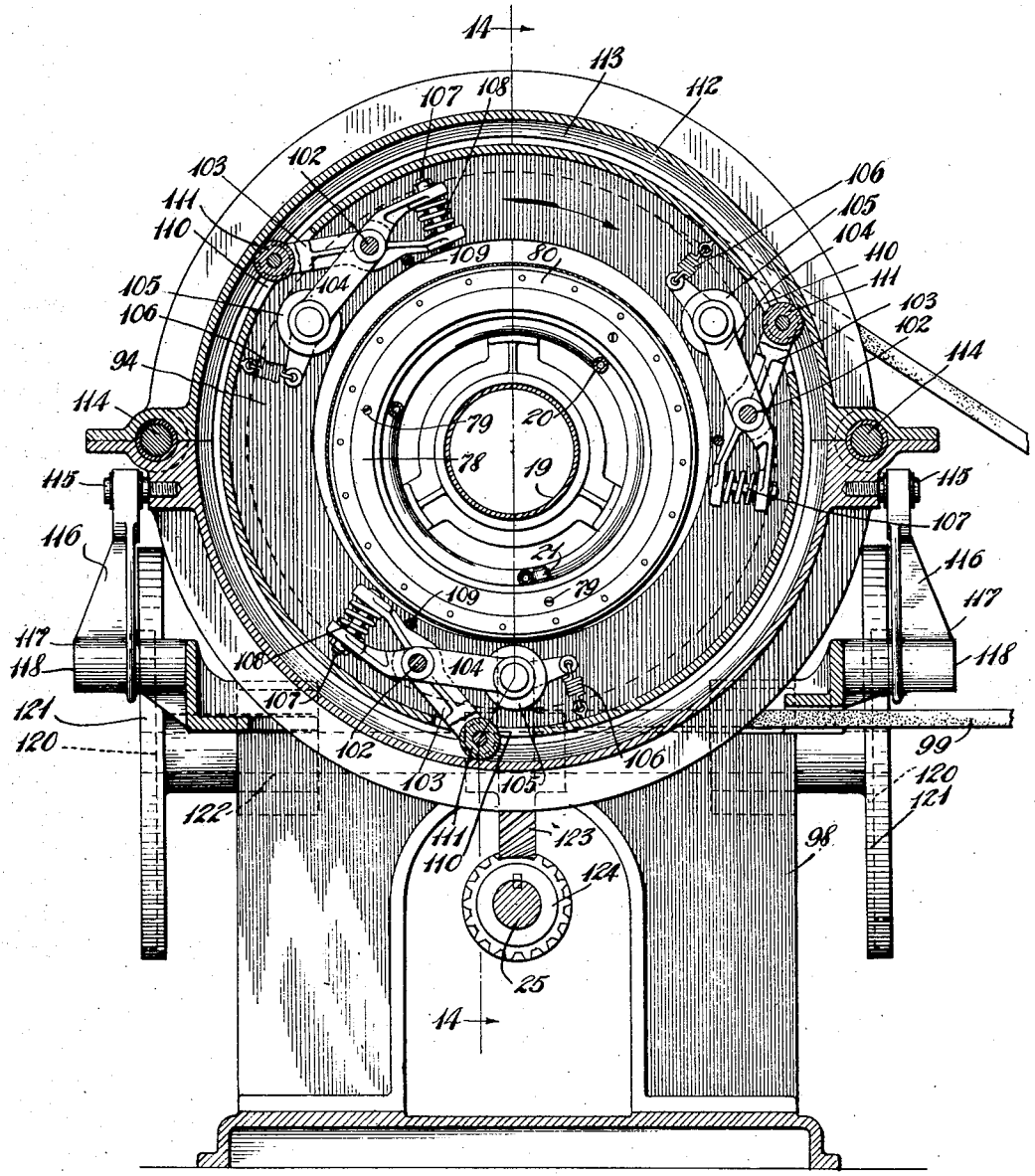
Fig. 15 is a vertical section on line 15—15 of Fig. 4 or Fig. 14.

Fig. 17 is a section on line 17—17 of Fig. 16.
Fig. 18 is a section on line 18—18 of Fig. 16.
Fig. 19 is a section on line 19—19 of Fig. 16.

*Drum-guiding and transferring devices.*

Referring to the drawings, the apparatus comprises (see Figs. 1 and 2) a plurality of turrets 10, 10 journaled on vertical axes and each formed with horizontally extending arms 11, 11 adapted to receive and accurately to support by three-line contact successive winding-forms or drums 12, 12 slid radially onto and off of the arms. Aligned arms of adjacent turrets are adapted to support between them a mandrel structure adapted at its receiving end to receive successive drums from the successive turret arms by which it is there supported and at its delivery end to guide successive drums onto the successive turret arms by which it is there supported, the drums being shoved along the mandrel structure in abutted relation thereon by addition of drums at the receiving end at the mandrel, and means being provided for rotating the series of drums as they are moved along the mandrel structure, so as to cause them to draw thereunto as a continuous layer a web of fabric running from a suitable source of supply. The fabric webs for the several series of drums are shown at 13, 13.

Each arm 11 is formed with a horizontal web 14 and a vertical web 15 (see Figs. 4 and 5) to provide three-line contact for accurately supporting and guiding the drums and each drum is formed with a pair of internal flanges 12ᵃ, 12ᵇ which engage the turret arms and the mandrel structures for centering the drums.

The horizontal web 14 of each arm at the outer end of the latter provides a ledge which is formed with a recess 16 (see Fig. 5) for the reception of a dowel 17 projecting downward from a shoulder formed on the end member 18 of the drum-supporting, guiding and rotating structure or mandrel. The mandrel comprises an axial tubular member 19 connecting the end members 18 and a plurality of helical bars 20, 20, which may be hollow, as shown, having their ends secured to the end member 18 and extending the full length of the drum guiding structure. Each of the drums 12 is provided with an inwardly projecting cam roller 21 (Figs. 13, 16 and 17) adapted to bear against one of the helical bars 20 to effect rotation of the drum 12 as the latter, slidably fitting upon the bars 20, is forced along the mandrel.

The drive mechanism comprises four shafts, 22, 23, 24, 25, which extend horizontally under and parallel with the respective mandrel structures and at the corners of the rectangle which they define the shafts have drive connection, each with the next, through bevel gears such as the gears 26, 27, 28 (see Fig. 6), the construction being such that each of the shafts 22 to 25 will be rotated clockwise as viewed from the receiving end of its mandrel structure, and the shafts 22 and 24, opposite each other in the rectangle, have drive connection, through respective shafts 29, 30, with a single motor 31 (see Figs. 1 and 2).

For lifting each mandrel structure with the drums thereon to clear the dowels 17 from their apertures in the respective turret arms and thus to permit the indexing of the turrets, each mandrel structure is provided at each of its ends with an arcuate lifting cradle 32 adapted to interfit with the lower side of the adjacent end member 18 of the mandrel structure and formed centrally of its arcuate face with a recess 33 to receive a dowel 34 projecting downward from the end member 18, to hold the mandrel structure in proper relation to be re-seated with its dowel 17 in the recess 16 of the turret arm, upon the descent of the lifting cradle.

Each lifting cradle 32 is formed upon the upper end of a cross-head 35 which is provided with downwardly-extending guide bars 36, 36 slidably mounted in a guide standard 36ᵃ rising from the floor and the cross-head 35 is provided with a laterally projecting cam roller 37 running upon the periphery of a cam 38 which (see Fig. 5) is formed with an internal set of gear teeth 39 meshed with pinions 40, 40 journaled upon stub shafts 41, 41 projecting from the guide standard 36ᵃ, the pinions 41 being on opposite sides of the drive shaft, such as the shaft 22, and meshed with a gear 42 keyed upon the shaft, and the cam 38 having its hub journaled upon the hub of the gear 42. The cams 38 are so formed and have such speed reduction through the gears 42 and pinions 41 as to raise and lower the mandrel structures between successive indexing movements of the turrets.

Each turret has a large, open-center, hub portion 43 (see Figs. 5, 6 and 11) which is journaled upon a hollow, vertical standard or axle member 44 and is supported from the base of the standard 44 by a roller thrust-bearing 45 interposed between the two. At its upper end the hub member of the turret is provided with an internal gear 46 meshed with a pinion 47 (see Fig. 4) which is secured upon the upper end of a vertical shaft 48 journaled in the standard 44 and provided at its lower end with a pinion 49 (see especially Fig. 11) adapted to coact with a mutilated gear 50 which is secured upon a shaft 51 journaled in the standard 44 at the center of the latter and constituting the shaft of the bevel gear 27, the construction and the gear ratios being such that the turret will be turned through 90° in each two revolutions of the horizontal drive shafts such as the shaft 22 or 25.

To draw the successive drums from the adjacent mandrel structure fully onto the turret arm, a lever 52, here shown as comprising a pair of parallel plates, formed with a cam hook 53 at its outer end is hinged at 54 to a slide 55 which is mounted in a guide bracket 56 rising from the standard 44 and a compression spring 57 (see Fig. 6) is interposed between the slide 55 and a rearwardly extending arm of the lever 52. The outer end of the said lever, adjacent its hook 53, is formed on the inner faces of its plates with cams 58, 58 adapted to coact with a cam 59 formed on the turret arm, to depress the end of the lever carrying the hook 53 momentarily at a certain position in the advancing and retracting movements of the lever, so that the lever after being engaged with the adjacent internal flange 12$^a$ of the winding-form or drum 12 through the cam action of the inclined face of the hook will be disengaged from the drum in the return movement of the hook, to leave the drum at a determinate position upon the turret arm, by the coaction of the cam 59 with the cams 58.

For advancing and retracting the slide 55 during the time that each turret arm is in association with the mandrel structure from which the drums are received, the slide is connected by a link 60 with a crank 61 secured upon the upper end of a shaft 62 which is journaled in the standard 44 and is provided at its lower end with a gear 63 (see Figs. 6 and 11) meshed with a gear 64 (see Figs. 5 and 11) which is secured upon the lower end of a shaft 65 journaled in the standard 44 and having thereon a pinion 66 adapted to coact with the mutilated gear 50 in alternation with the turret indexing pinion 49 (see Fig. 11).

For pushing a drum from the adjacent turret arm onto the next mandrel structure at the same time that a drum is pulled onto the turret by the lever 52, a slide 67 (see Fig. 5) is mounted upon a horizontal guide bar 68 projecting from the bracket 56 and is provided with a roller 69 journaled on a vertical stub shaft 70 which projects downward from the slide, the roller 69 being adapted to engage the drum 12 to slide the drum from the turret arm to the adjacent mandrel structure and by its rotation to permit the drum to be rotated by the mandrel structure while continuing to be pushed by the roller. For actuating the slide 67 a link 71 connects it with a crank 72 secured upon the upper end of the shaft 65.

As will be apparent upon reference to Figs. 4, 5 and 6 the link 71 and crank 72 are at higher elevations than the slide 55, link 60 and crank 61, so that the two sets of mechanism clear each other in operation.

*Width-adjustment of drums.*

Each of the winding forms or drums 12 is formed in its inwardly extending annular flanges 12$^a$, 12$^b$ with bearing apertures for three pairs of spacer screws 73, 74, 73, 74 having cylindrical portions (see Fig. 17) slidably mounted in bushings 75, 76 secured in the bearing apertures. The spacer screws 74, at one side of the drum, are slidably keyed in the respective bushings 76 by means of respective keys 77 and the spacer screws 73, at the other side of the drum, are held against rotation in the respective bushings 75 by a knife-supporting ring 78 coaxial with the drum and secured, as by screws 79, 79 (see Figs. 13 and 17), to the several spacer screws 73. Mounted upon the ring 78 is an annular knife 80 having its cutting edge extending outward slightly beyond the cylindrical outer periphery of the drum which carries it, so that the tubular structure of fabric wound upon the series of drums may be severed into endless bands by roller-pressing the fabric against the knives of the successive drums.

The spacer screws 73, 74 of each pair have their inner end portions reversely threaded Mounted upon them, between and in abutted relation to the bushings 75, 76, is a sleeve 81 having in its middle region a bore large enough to accommodate the threaded portions of the screws and having at its ends threads complemental to and meshed with the threads of the screws, the construction being such that rotation of the three sleeves 81 of the drum will drive the spacer screws 73 from or toward each other to vary the effective width of the drum to produce tire bands of different widths, the spacer screws 74 being adapted to project in an axial direction from the drum, as shown clearly in Fig. 6, to abut the knife holder 78 or the screws 79 of the adjacent drum, to provide equal spacing of the two adjacent knives with respect to the middle plane of each drum, so that when superposed plies of successively greater widths are produced upon the drum each ply will extend for the same distance on each side of the middle plane of the drum and will have the same amount of overhang at the two sides of the drum; as will be clear upon reference to the plies $a$, $b$, $c$ and $d$ shown in Figs. 3 and 6 and the position of the spacer screw 74 and that of the knife 80 as shown in Fig. 6.

A bearing sleeve 82 (Fig. 17) may be mounted upon the inner end of each of the bushings 75, 76 and the adjacent end of the sleeve 81 and secured on the bushing by a set-screw 83 to maintain the sleeve 81 coaxial with the screws and thus avoid cramping and excessive friction of the screw threads.

For concurrently rotating the three sleeves 81 of each drum each sleeve is formed at its middle as a sprocket 84 and a roller-type sprocket-chain 85 (see Figs. 16 and 17), provided with a tightener 86 and with handles 87, 87, is meshed with the three sprockets, the chain extending about them as a group. To hold the sprocket chain 85 to arcuate form between the adjacent sprockets 84 an arcuate guide rail 88 adapted for the rollers of the sprocket-chain to run thereon is mounted in each of the spaces between adjacent sprockets, the rail being supported by U-shaped brackets 89, 89 mounted upon the inner face of the drum at the respective ends of the guide rail.

Each of the handles 87 is formed with a forked outer end straddling the guide rail 88 and constituting a link of the sprocket-chain 85 (see Fig. 19) and a plunger 90 backed by a compression spring 91 is mounted in the handle and is formed with a conical outer end 92 adapted to seat in one or another of complemental depressions 93, 93 (see Fig. 16) formed in the inner faces of the guide rails 88, the plungers 90 being adapted to be dislodged from one depression by forceful movement of the handles 87 along the rails, and to drop into another of the depressions under the force of the respective springs 91, to hold the spacer-screws 73, 74 in proper adjustment for different widths of tire bands.

Severing devices.

Each severing device, adapted to coact with the knives 80, comprises an annular casting 94 journaled upon two circumferential series of rollers 95, 95 (Fig. 14) which are engaged in grooves formed in the inner faces of annular flanges 96, 96 projecting from the respective sides of the casting 94, the rollers 95 being journaled upon stub shafts 97, 97 projecting from an annular frame casting 98 which rises from the floor, the castings 98 and 94 encircling the drum-guiding mandrel structure and the winding forms or drums mounted thereon and being concentric with the mandrel structure when the latter is in its lifted position.

The rotatable casting 94 is adapted to be constantly driven by a pair of V-belts 99, 99 running from a motor 100 and mounted in grooves formed in the outer faces of flanges 96.

The rotatable casting 94 is formed with parallel inwardly extending flanges 101, 101 (see Figs. 14 and 15) which are connected at spaced intervals by fixed shafts 102, 102 upon each of which are pivoted a pair of two-armed levers 103, 103, 104, 104, the two levers being crossed in the manner of scissor blades, and the crossed pair of levers being disposed in a roughly tangential relation to the central space of the casting and the winding forms which pass therethrough. The rear arm of the lever 104 has journaled thereon a cylindrical cutter roll 105 adapted to coact with the knives 80 of the winding forms and is connected by a pull spring 106 with the outer wall of the casting 94, the spring 106 being adapted normally to hold the lever 104 with its cutter roll 105 spaced away from the work. The forward ends of the levers 103 and 104 are urged apart, toward the limit permitted by a tie-bolt 107, by a compression spring 108 interposed between them (see Fig. 15), and a stop-bar 109 connects the flanges 101 of the casting and is adapted to be abutted by the forward arm of the lever 103 to limit the movement of the cutter roll 105 away from the work, the compression spring 108 being of such strength as not to be overcome by the pull spring 106. The rear arm of the lever 103 extends outward through an opening 110 in the outer wall of the rotatable casting 94 and is provided at its outer end with a roller 111 adapted to run on the inner surface of an annular structure 112 which encircles the rotatable casting 94 and is formed with an inner conical surface 113 adapted to engage the rollers 111 to force them inward and thus to drive the cutter rolls 105 yieldingly into engagement with the work, to sever the latter against the knife 80 when the conical structure 112 is moved in an axial direction to the right as viewed in Fig. 14, and to permit the cutter rolls to be withdrawn from the work by the pull springs 106 when the conical structure is moved in the other direction, the conical structure being mounted for such movement upon horizontal guide-bars 114, 114 mounted at opposite sides of the work between brackets formed on the frame casting 98 (see Figs. 12 and 15). The conical structure 112 may be formed in two sections as shown.

For sliding the conical structure 112 on the bars 114 the said structure is provided at each side with a stud 115 occupying a fork formed in the upper end of a substantially vertical arm 116 of a bell-crank lever 117 which is fulcrumed at 118 upon the frame-casting 98, the bell-crank lever having a horizontal arm 119 (see Fig. 12) which is provided at its outer end with a cam roller running in a cam-groove 120 formed in a cam 121, the two cams 121, at opposite sides of the device, being secured upon the respective ends of a shaft 122 extending from side to side of the frame casting 98 and journaled therein, under the mandrel structure, and provided at its middle with a worm gear 123 meshed with a worm 124 which is secured on the adjacent drive shaft such as the drive shaft 25. The cam 121 is so timed as to cause the cutter rolls 105 to be forced in against the work to sever the latter and to be withdrawn outward again while the winding forms and the work thereon are at rest upon the mandrel, the mandrel at such times being in its elevated position, concentric with the severing device. The several parts of the apparatus are so constructed and arranged that the drums, at the position of the cutting device, will be stopped with one after another of their knives 80 within the axial limits of the cylindrical cutting rolls 105.

Band-removing devices.

To facilitate the removal of the tire bands from the respective drums, after the drum has made the circuit of the four winding and cutting devices and has returned to the turret at which the operation began, each drum is formed on its outer periphery with a plurality of circumferential grooves 125, 126 (see Figs. 6, 7 and 8) which communicate through apertures 127, 128, 129 (see Fig. 8) with an arcuate chamber 130 defined by integral portions of the drum body including an inner arcuate wall 131 which is formed complementally to fit against an arcuate wall 132 of an air chamber 133 mounted upon the turret arm. The wall 131 of the drum and the wall 132 of the air chamber 133 are formed with respective arcuate slots 134 and 135 registrable with each other for the passage of air from the air chamber 133, through the slots 135 and 134, the chamber 130 and the apertures 127, 128, 129, into the circumferential grooves 125, 126 on the outer surface of the drum, to expand and provide air-lubrication for the tire-band in its removal from the drum. The circumferential grooves 125, 126 are preferably of reduced depth in each circumferential direction from the chamber 130, so that the tire-band will be subjected to substantially the same air pressure at all points about its circumference, and the apertures 127, 128 and 129, each communicating with both of the circumferential grooves, as shown with respect to the aperture 127 in Fig. 5, are of such small capacity as to have a sufficient throttling effect to assure a substantial air pressure in the inner groove 126 after the tire band is so lifted from the groove 125, as shown in Fig. 5, as partially to relieve the air pressure in that groove. This feature of my invention is of course not limited to the employment of only two grooves.

The air chamber 133 of each turret arm communicates, through a conduit 136 secured to the under side of the turret arm (see Figs. 5 and 8), with a port 137 (Figs. 5 and 7) formed in the cylindrical hub member of the turret and registrable with a port 138 formed in the wall of the standard 44 upon which the turret is journaled, the port 138 having communication, through a stationary pipe 139, with a suitable source of compressed air. A friction-reducing and sealing ring 140, preferably of suitable soft metal but permissibly of other packing material, may be interposed between the standard 44 and the hub portion 43 of the turret and apertured at 141 (Figs. 5 and 7) to provide communication between the pipe 139 and the conduit 136.

General drive mechanism.

The drive from the motor 31 (Figs. 1 and 2) to the turret-driving shafts 29 and 30, in the embodiment here shown, includes a belt 142 running from the motor pulley to a larger pulley 143, which has connection, through a hand-operated clutch 144; with a small pulley 145 connected by a link-belt 146 with a larger pulley 147 secured upon a shaft 148. The shaft 148 is connected with the shafts 29 and 30 at its respective ends through respective cushion-drive devices 149 (Fig. 1) and 150 (Fig. 2). Each cushion-drive device comprises a pair of spiders 151, 152 (Figs. 9 and 10) having drive connection with each other through compression springs 153, 153 interposed between their arms. The spider 151 is secured upon the end of the shaft 148 and the spider 152, of the shaft 29 or 30, is mounted upon a sleeve 154 keyed upon the shaft. The spider 152 is held against rotation upon the sleeve 154 only by a break-pin 155 inserted in abutted hard metal bushings 156, 157 (Fig. 9) which are mounted in suitable holes formed respectively in the spider and in a flange 158 constituting a part of the sleeve 154, the break-pin being formed with a circumferential groove to weaken it at the meeting plane of the bushings 156, 157. Thus the construction is such that in case of overload upon either the shaft 29 or the shaft 30 the corresponding pin 155 will be broken, which will release the drive of that shaft and immediately throw the entire load upon the other of the two shafts, cause the break-pin of that shaft also to be sheared off, and thus stop the drive of the machine.

Operation.

In the operation of the apparatus, assuming the first mandrel structure, at the right of Fig. 2, to be filled with drums, and the apparatus to be continuously driven by the motors 100 of the severing devices and by the main drive motor 31, the series of drums upon that mandrel structure are driven forward and rotated by the addition thereto, at its receiving end, of empty drums which are mounted by hand upon the successive arms of the turret there located and are forced onto the mandrel structure by the operation of the drum-transferring mechanism which includes the slide 67 and roller 69 (see Fig. 5). As the series of drums is thus driven forward and rotated upon the mandrel structure the first web of fabric 13 is drawn from a suitable source of supply and started upon the series of drums at a proper position and angle, being held on the drums by hand until it has become adequately anchored in one or more turns thereon, the pitch of the guide rails 20, the width of the fabric, and the angle at which it is started on the drums being so correlated as to cause the web of fabric to be drawn onto the series of drums with adjacent margins of successive turns contacting and permissibly slightly overlapping each other to form a continous tubular structure of fabric upon the drums.

At each stepping forward of the series of drums by the action of the drum-transferring mechanism the severing device is automatically actuated by the cam 38 and when the tubular structure of fabric reaches the position of the severing device the latter severs it into endless bands at the parting planes of the successive drums.

After each severing operation the drum having the severed band thereon passes onto the turret at the delivery end of the first mandrel structure, and by the turret mechanism is started upon the next mandrel structure.

When a suitable number of the drums having single ply bands of fabric thereon have been received upon the second mandrel structure the second web of fabric 13 is started thereon in the same manner as the first web was started upon the empty drums except that, the pitch of the second mandrel structure being reversed as compared with that of the first, in order to cross the threads of the second ply with those of the first, the fabric is led over the series of drums as shown, instead of under the drums, as shown with respect to the first mandrel structure.

Similarly, the webs of fabric for the third and fourth plies are started upon the drums as the foremost drums reach the proper positions upon the third and fourth mandrel structures, each of the several plies being severed between drums before passing from the mandrel structure upon which the respective ply is wound onto the drums.

When the drums, each with a four-ply band thereon, begin to arrive at the first of the turrets, where the operation began, the bands are removed in succession from the drums, while the latter remain upon the turret arms, preferably by the aid of compressed air supplied through the air conducting means including the chamber 133, as shown best in Figs. 2 and 5, the empty drum being left on the turret arm and continuing in circulation.

The apparatus, then being in full operation, is continuously driven and is fully automatic, as to bands having all their plies of equal width, except that the bands require to be removed from the successive drums as the latter arrive at the position of removal indicated by the flared condition of one of the bands at the lower right hand corner of Fig. 2.

In case plies of successively greater width are desired in each band, the effective width of each drum is increased by adjustment of the knife 80 and spacer screws 74 of the drum, by manipulation of the handles 87 (see Figs. 16 to 19), after each ply has been received upon the drum and while the drum is upon the turret by which it is transferred for the reception of the next ply. After the removal of the four-ply band from the drum, the drum is reduced to its original effective width, by reverse manipulation of the handles 87, while it is on the turret, at the lower right hand corner of Fig. 2, by which it is passed forward for the reception of the first ply of the next band to be wound upon it.

The many advantages of my invention will be manifest, including those set out in the above statement of objects, and it will be manifest that my invention is susceptible of extensive modification without sacrifice of all of these advantages and without departure from its scope, and I do not wholly limit my claims to the specific procedure or apparatus herein described.

I claim:

1. Band-making apparatus comprising a set of winding drums, a drum-guiding structure extending axially through the drums, means on the drums and means on the said structure for causing rotation of the drums wholly in consequence of their movement along the structure, and means mounted for reciprocating movement substantially in an axial direction with relation to the drums' rotation for impelling the drums along the structure.

2. Band-making apparatus as defined in claim 1 including supporting means for the drum-guiding structure so constructed and arranged as to permit through passage of drums of closed annular form passed onto one end and removed from the other end of the structure.

3. Band-making apparatus comprising a set of winding drums, a drum-guiding structure extending axially through the drums, means for supporting the said structure otherwise than through the drums and so constructed and arranged as to permit drums of closed annular form and mounted upon the drum-guiding structure to be moved thereon past the said supporting means, and means for effecting longitudinal and rotative movement of the drums on the drum-guiding structure.

4. Band-making apparatus comprising a set of winding drums, a drum-guiding structure extending axially through the drums, drum-guiding means engageable with an end portion of the said structure for supporting the same and guiding a drum thereonto, and means engageable with the end portion of the said structure, for supporting the same, in alternation with the said drum-guiding means.

5. Band-making apparatus comprising a set of winding drums, a drum-guiding structure extending axially through the drums, and two alternative means for supporting the said structure and adapted, by reason of their alternative operation, to permit through passage, upon the said structure, of drums of closed annular form passed axially thereonto.

6. Band-making apparatus comprising two drum-guiding structures, a winding drum, and a turret for transferring the drum from one to the other of said structures, the turret comprising an arm adapted to receive thereon and lie within a winding drum of closed annular form and to be engaged with the drum-guiding structures alternately to support the same.

7. Band-making apparatus as defined in claim 6 including means for impelling the drum on the turret arm and means interconnected therewith for indexing the turret in timed relation to the operation thereof.

8. Band-making apparatus comprising a turret, a stationary journal member therefor, means on the turret for carrying successive winding drums, means for delivering successive winding drums to the turret, a band-winding mechanism mounted to receive the winding drums from the turret, means for moving the winding drums from the carrying means to the band-winding mechanism, and means mounted in the stationary journal member for actuating the said drum-moving means.

9. Band-making apparatus as defined in claim 8 in which the drum-moving means comprises a slide mounted for movement radially of the turret, a shaft parallel with the axis of the turret, a crank on the shaft, and a link connecting the crank and the slide.

10. Band-making apparatus comprising a turret, means on the turret for carrying successive winding drums, means for delivering successive winding drums to the turret, a band-winding mechanism mounted to receive the winding drums from the turret, means for moving the winding drums to a determinate position on the carrying means as they are received from the said delivering means, and means for passing the winding drums from the carrying means to the band-winding mechanism.

11. Band-making apparatus as defined in claim 10 in which the drum-moving means comprises a drum-engaging hook and actuating means therefor extending through the journal of the turret.

12. Band-making apparatus comprising a drum-guiding structure and supporting means for the said structure adapted to permit through passage of a drum of closed annular form passed onto the said structure at one of the latter's ends and removed therefrom at its other end, the said supporting means comprising a drum-supporting and guiding member adapted for quick-detachable connection to the said structure in extension thereof.

13. Band-making apparatus comprising a set of winding drums, a drum-guiding structure extending axially through the drums, means on the drums and means on the said structure for causing rotation of the drums in consequence of their movement along the structure, means mounted for movement substantially in an axial direction with relation to the drums' rotation for impelling the drums along the structure, and means for transversely severing a tubular structure wound upon the drums, the severing means comprising annular cutters mounted upon the respective drums and means for roller-pressing the tubular structure against the said cutters.

14. Band-making apparatus as defined in claim 13 in which the drum-impelling means comprises a member mounted for to-and-fro movement to advance the set of drums intermittently and in which the roller-pressing means comprises a roller-mounting journaled for rotation about the drum-guiding structure at a determinate position lengthwise thereof, a roller on said roller-mounting, and means for pressing the roller against the work.

15. Band-making apparatus comprising a winding form, an annular cutter coaxially associated therewith, a member journaled for rotation about the said cutter, and means on said member for coacting with the cutter to sever a sheet of material overlying the same.

16. Band-making apparatus as defined in claim 15 including a conical cam member coaxial with the drum and movable lengthwise thereof for actuating the means which coacts with the cutter.

17. Band-making apparatus comprising a winding form and means for transversely severing a tubular structure of sheet material thereon, the severing means comprising a work-engaging member journaled for rotation about the drum and a conical cam member coaxial with the drum and movable lengthwise thereof to actuate said work-engaging member.

18. Band-making apparatus comprising a set of winding drums, alternate drum-guiding and drum-transferring devices arranged in circuit, each drum-guiding device comprising means for guiding the drums in an axially-progressing and rotative movement and each drum-transferring device comprising means for removing drums from one of the drum-guiding devices and mounting it upon the next.

19. Band-making apparatus as defined in claim 18 in which each drum-guiding device comprises a supporting structure for the drums adapted for through passage of drums of closed annular form received in telescoped relation thereon and in which each drum-transferring device comprises a member adapted to be engaged with the adjacent ends of the two adjacent drum-supporting structures alternately to support the same and to guide the drums with relation thereto.

20. Band-making apparatus comprising a set of winding drums, a drum-guiding structure extending axially through the drums, means on the drums and means on the said structure for causing rotation of the drums in consequence of their movement along the structure, means for intermittently advancing the set of drums along the structure, and means for severing into endless bands a tubular structure of material mounted on the drums, the severing means comprising annular cutters so mounted upon the respective drums as to be adjustable in an axial direction thereon and means for roller-pressing the work against the said cutters.

21. Band-making apparatus comprising a winding drum, means for rotating the drum, an annular cutter associated with the drum, means for holding the cutter at different positions axially of the drum, and means for pressing against the cutter a layer of material mounted upon the drum and cutter.

22. Band-making apparatus comprising a plurality of winding-drum structures each including an annular cutter, means for holding the said structures in axial alignment and in abutted relation, and means for pressing against the cutters a layer of material mounted upon the drums.

23. Band-making apparatus comprising a plurality of winding-drum structures, means for holding the said structures in axially aligned and abutted relation, and means for pressing against the said structures a layer of material mounted thereon, each of the said structures comprising a drum body, an annular cutter mounted at one end thereof, spacer means mounted at the other end thereof, and means for holding the cutter and the spacer means at different positions axially of the drum body to vary the effective axial dimension of the drum structure.

24. Band-making apparatus as defined in claim 23 including means common to the cutter and the spacer means for concurrently moving them to different positions of adjustment.

25. Band-making apparatus comprising a plurality of winding-drum structures each comprising drum-body and a cutter associated therewith, means for suproting the said structures in axially aligned and abutted relation, means for coacting with the cutters to sever a layer of material overlying the same, and means for varying the effective axial dimensions of the said structures.

26. The method of making endless bands which comprises helically winding strip material and thereby forming a tubular structure thereof, transversely severing the tubular structure into endless bands, supporting a plurality of the endless bands in coaxial and spaced-apart relation to each other and helically winding strip material onto them while they are so supported to form a second tubular structure and then transversely severing the second tubular structure.

27. A method as defined in claim 26 in which the first tubular structure is fed from the forming position as it is formed and in which the endless bands severed therefrom are moved in procession from the severing position and are rotated in axially spaced-apart relation for drawing the second winding of material onto them.

28. The method of making endless bands which comprises helically winding strip material and thereby forming a tubular structure thereof, transversely severing the tubular structure into endless bands, supporting a plurality of the endless bands in coaxial and spaced-apart relation to each other and helically winding strip material onto them while they are so supported to form a second tubular structure and then transversely severing the second tubular structure at positions between adjacent bands of the set produced by the severance of the first tubular structure.

In witness whereof I have hereunto set my hand this 9th day of September, 1927.

JOHN R. GAMMETER.